United States Patent
Luo (10) Patent No.: US 10,333,598 B2
(45) Date of Patent: Jun. 25, 2019

(54) WEIGHTED AGGREGATION-BASED METHOD AND DEVICE FOR TRANSMITTING CONTROL SIGNALS

(71) Applicant: Alcatel Lucent, Boulogne Billancourt (FR)

(72) Inventor: Qinglin Luo, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/515,669

(22) PCT Filed: Sep. 30, 2014

(86) PCT No.: PCT/CN2014/088066
§ 371 (c)(1),
(2) Date: Mar. 30, 2017

(87) PCT Pub. No.: WO2016/049934
PCT Pub. Date: Apr. 7, 2016

(65) Prior Publication Data
US 2017/0331540 A1    Nov. 16, 2017

(51) Int. Cl.
*H04B 7/06* (2006.01)
*H04W 16/00* (2009.01)
*H01Q 3/26* (2006.01)

(52) U.S. Cl.
CPC ........... *H04B 7/0615* (2013.01); *H01Q 3/267* (2013.01); *H04B 7/0617* (2013.01); *H04W 16/00* (2013.01)

(58) Field of Classification Search
CPC ..... H04W 16/14; H04W 40/04; H04W 72/04; H04W 72/042; H04W 72/044;
(Continued)

(56) References Cited

U.S. PATENT DOCUMENTS 5,517,200 A    5/1996    McAdam et al.
2013/0121185 A1    5/2013    Li et al.
(Continued)

FOREIGN PATENT DOCUMENTS

EP    1783921 B1    12/2007
WO    2014142506 A1    9/2014
WO    2014142516 A1    9/2014

OTHER PUBLICATIONS

English Bibliography for PCT Patent Application Publication No. WO 2014/142516, published Sep. 18, 2014, printed from Derwent Innovation on May 2, 2018, 7 pp.
(Continued)

*Primary Examiner* — Shaima Q Aminzay
(74) *Attorney, Agent, or Firm* — Fay Sharpe LLP (57) ABSTRACT

An objective of the application is to provide a method and apparatus for transmitting control signals based on weighted aggregation. Specifically, the method comprise: determining aggregation level weight vectors corresponding to control signals to be transmitted by multiple antenna elements corresponding to the common control channel port, and transmitting the control signals through the multiple antenna elements based on the aggregation level weight vectors. Compared with the prior art, the present application implements enhancement of the common control channel coverage in the 3D-MIND system, and solves the problem of coverage holes in 3D-MIMO due to the introduction of a 2D planar array; moreover, the antenna array gains of the present application are more uniformly distributed in the whole EOD (elevation angle of departure) span, and the gains are significant.

18 Claims, 5 Drawing Sheets

(58) Field of Classification Search
CPC ............ H04W 72/0453; H04W 72/085; H04B 7/0413; H04B 7/0417; H04B 10/2581; H04B 7/2041; H04B 7/0615; H04B 7/0619
USPC ...................................................... 455/550.1
See application file for complete search history.

(56) References Cited

U.S. PATENT DOCUMENTS

2014/0105150 A1    4/2014   Kim et al.
2015/0372740 A1   12/2015   Ko et al.
2015/0382223 A1   12/2015   Ko et al.
2017/0244462 A1*   8/2017   Wei ...................... H04B 7/0469

OTHER PUBLICATIONS

PCT Pat. App. No. PCT/CN2014/088066, Written Opinion of the International Searching Authority, dated May 26, 2015, 6 pp.
European Pat. App. No. 14903478.7, Extended European Search Report, dated Apr. 26, 2018, 10 pp.
Huawei et al., WF on Antenna Model in 3D Channel Modeling,: $3^{rd}$ Generation Partnership Project (3GPP), 3GPP TSG RAN WG1 #72bis, R1-131761, 7 pages, Chicago, USA, Apr. 15-19, 2013.
International Search Report for PCT/CN2014/088066 dated May 26, 2015.
English Bibilography for International Patent Application No. WO2014142506A1, published Sep. 18, 2014, printed from Derwent Innovation on Mar. 14, 2019, 8 pages.

* cited by examiner

WEIGHTED AGGREGATION-BASED METHOD AND DEVICE FOR TRANSMITTING CONTROL SIGNALS

FIELD OF THE APPLICATION

The present application relates to the field of communication technologies, and more specifically, relates to a technique for weighted aggregation-based for transmitting control signals.

BACKGROUND OF THE APPLICATION

Figure 1:
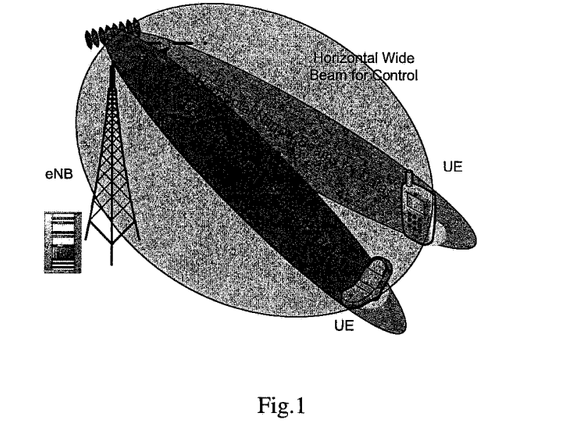
FIG. 1 illustrates a schematic diagram of an example of traditional MIMO.
Figure 2:
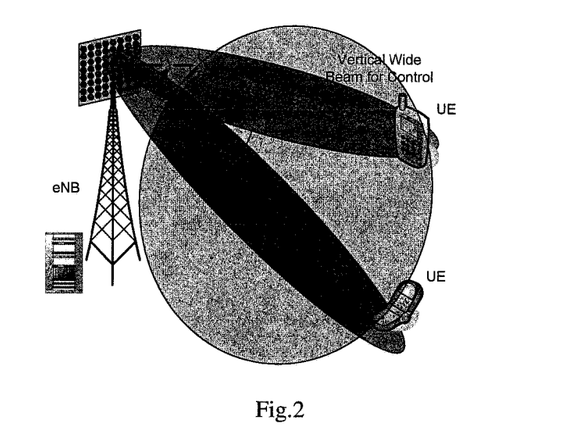
FIG. 2 illustrates a schematic diagram of an example of 3D-MIMO.

In conventional MIMO (Multiple Input Multiple Output) systems, such as FIG. 1 gives one example of conventional MIMO, the eNB (evolved Node B) is mainly optimized to serve UEs (User Equipment) on the ground. In the vertical dimension, the same narrow beam is applied to both data and control. This vertical beam is usually pointing to the UE in the ground which has most of the traffics flows. In the horizontal dimension, the narrow beam is only applied to data. Wide beam is applied to control to ensure its reliability in the targeted coverage area. However, in a 3D-MIMO system, such as an example of 3D-MIMO shown in FIG. 2, the eNB needs to cover UEs both on the ground and on high floors. In order to achieve this target, the eNB uses different vertical beam to serve UEs on different floors. In order to ensure reliable decoding of PDCCH (Physical Downlink Control Channel), using a fixed vertical narrow beam may be risky, especially for the UEs on the high floors. Therefore, the eNB needs to implement a wide vertical beam for PDCCH transmission. This wide vertical beam can patch the coverage holes of PDCCH caused by a narrow vertical beam in the vertical dimension. It also creates reasonable 3D cell coverage for each eNB so that the eNB is able to adjust the vertical narrow beam to transmit data to any UE as long as it is within the 3D coverage area of its PDCCH. But the existing wide beam pattern for control channel transmission in a 3D-MIMO system, such as 3GPP RAN1 R1-142860, "On cell association in FD-MIMO systems", it does not have coverage holes for PDCCH transmission in the vertical dimension. But the problem is that the 10-element antenna array gain relative to a single antenna element diminishes. The coverage hole is avoided at the cost of reduced coverage range. Therefore, a scheme is needed that not only can avoid coverage holes in the vertical dimension, but also can enhance the common control channel coverage in a 3D-MIMO system to achieve a certain performance target, such as at least matching that of the 2D-MIMO system.

SUMMARY OF THE APPLICATION

An objective of the application is to provide a method and apparatus for transmitting control signals based on weighted aggregation.

According to one aspect of the application, there provides a method, at a base station end, for transmitting control signals based on weighted aggregation, comprising:
 a. determining respective aggregation level weight vectors corresponding to the control signals to be transmitted by multiple antenna elements corresponding to a common control channel port;
 b. transmitting the control signals through the multiple antenna elements based on said respective aggregation level weight vectors.

According to another aspect of the application, there provides a method, at a user equipment end, for facilitating transmitting control signals based on weighted aggregation, comprising:
 receiving control signals transmitted by a corresponding base station through multiple antenna elements corresponding to a common control channel, wherein the control signals are transmitted based on respective aggregation level weight vectors corresponding to the multiple antenna elements;
 wherein the method further comprises:
 receiving said respective aggregation level weight vectors sent by the base station for performing DCI blind detection operation to obtain downlink control information corresponding to the control signals.

According to one aspect of the application, there provides a base station end for transmitting control signals based on weighted aggregation, comprises:
 a vector determining apparatus configured to, determine respective aggregation level weight vectors corresponding to the control signals to be transmitted by multiple antenna elements corresponding to a common control channel port;
 a transmitting apparatus configured to, transmit the control signals through the multiple antenna elements based on said respective aggregation level weight vectors.

According to another aspect of the application, there provides a user equipment end for facilitating transmitting control signals based on weighted aggregation, comprises:
 a first receiving apparatus configured to receive control signals transmitted by a corresponding base station through multiple antenna elements corresponding to a common control channel, wherein the control signals are transmitted based on respective aggregation level weight vectors corresponding to the multiple antenna elements;
 wherein the user equipment further comprises:
 a second receiving apparatus configured to receive said respective aggregation level weight vectors sent by the base station for performing DCI blind detection operation to obtain downlink control information corresponding to the control signals.

According to another aspect of the application, there provides a system for transmitting control signals based on weighted aggregation, wherein, the system comprises a base station aforesaid according to one aspect of the application and a user equipment aforesaid according to another aspect of the application.

Compared with the prior art, by determining aggregation level weight vectors corresponding to control signals to be transmitted by multiple antenna elements corresponding to the common control channel port, and transmitting the control signals through the multiple antenna elements based on the aggregation level weight vectors, one embodiment of the present application implements enhancement of the common control channel coverage in the 3D-MIMO system, and solves the problem of coverage holes in 3D-MIMO due to the introduction of a 2D planar array; moreover, the antenna array gains of the present application are more uniformly distributed in the whole EOD (elevation angle of departure) span, and the gains are significant.

BRIEF DESCRIPTION OF THE ACCOMPANYING DRAWINGS

Other features, objectives, and advantages of the present application will become more apparent through reading detailed depiction of the non-limiting embodiments made with reference to the accompanying drawings.

Same or similar reference numerals in the accompanying drawings represent same or similar components.

DETAILED DESCRIPTION OF THE PREFERRED EMBODIMENTS

Hereinafter, the present application will be described in detail with reference to the accompanying drawings.

Figure 3:
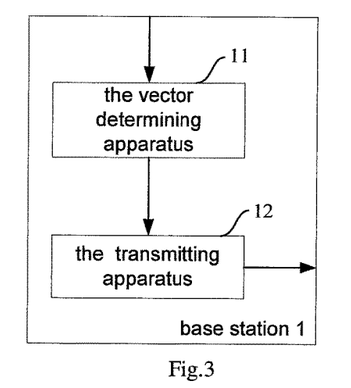
FIG. 3 illustrates a device schematic diagram of a base station for transmitting control signals based on weighted aggregation according to one aspect of the present application.

FIG. 3 illustrates a device schematic diagram of a base station 1 for transmitting control signals based on weighted aggregation according to one aspect of the present application, wherein, the base station 1 comprises a vector determining apparatus 11 and a transmitting apparatus 12. Specifically, the vector determining apparatus 11 determines respective aggregation level weight vectors corresponding to the control signals to be transmitted by multiple antenna elements corresponding to a common control channel port; the transmitting apparatus 12 transmits the control signals through the multiple antenna elements based on said respective aggregation level weight vectors. Here, the base station 1 refers to a device that connects a fixed part and a wireless part in a mobile communication system and is connected to a mobile station via an air wireless transmission, including, but not limited to, Node B base station, eNB base station, etc. Those skilled in the art should understand that base station are only examples, and other existing or future possibly emerging base stations, if applicable to the present application, should also be included within the protection scope of the present application, and are incorporated here by reference.

Figure 4:
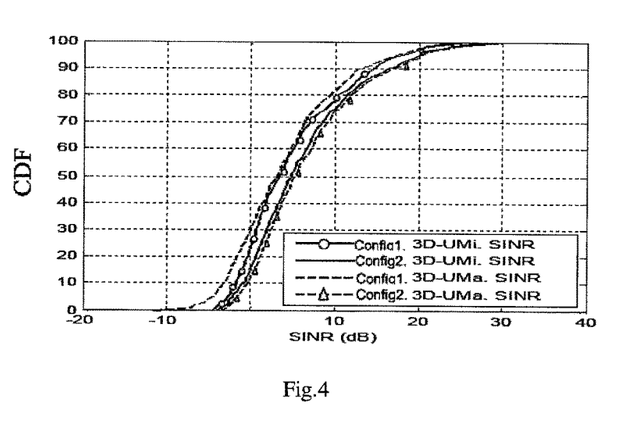
FIG. 4 shows a schematic diagram of cumulative distribution functions of different scenarios ("3D UMa" and "3D UMi") under different configurations.

Here, in order to better understand the present application, first, analysis on the requirement for 3D-MIMO system coverage enhancement will be illustrated:

In order to identify the coverage enhancement for the PDCCH channel under 3D-MIMO, two system level simulations are carried on both UMa scenario (Urban Macro cell with high (outdoor/indoor) UE density, hereinafter referred to as "3D UMa") and UMi scenario (Urban Micro cell with high (outdoor/indoor) UE density, hereinafter referred to as "3D UMi") based on the 3GPP 3D-MIMO channel model in TR 36.973 standard, respectively. One is for configuration 1 with single antenna element per port (i.e., traditional 2D-MIMO having a linear array), the other is for configuration 2 with 10 elements per port (i.e., 3D-MIMO having a planar array). By measuring the SINRs (Signal to Interference plus Noise Ratios) of all UEs at a given port (e.g., port 0), CDFs (cumulative distribution functions) of different scenarios and different configurations shown in FIG. 4 are derived, thereby showing differences of corresponding SINRs. From the FIG. 4 it can be seen that the per-port SINR of configuration 1 (conventional 2D-MIMO with linear array) is almost always 3 dB higher than that of configuration 2 (3D-MIMO with planar array). This observation illustrates that the common control channel of a 3D-MIMO system is 3 dB worse than that of a comparable 2D-MIMO system. The reason is that in 2D-MIMO system, each antenna port consists of multiple antenna elements, but in 3D-MIMO system, each port may only consist of one element thus have less combining gain.

In the current LTE specifications, the search spaces $S_k^{(L)}$ and $ES_k^{(L)}$ for PDCCH and EPDCCH (enhanced PDCCH) respectively defines a set of control channel candidates for each aggregation level L and subframe K. Which CCE (Control Channel Element) or ECCE (Enhanced Control Channel Element) that belong to each candidate are given by the search space equations in 3GPP TS 36.213. In addition to L and K, the RNTI (Radio Network Temporary Identifier) and the EPDCCH set index and size has impact on the search space expression.

To enhance the coverage of the control channels in 3D-MIMO, a simple method is to repeat the transmission of the CCEs/ECCEs given by the same search spaces within a subband/time window, e.g., several consecutive RBs/subframes. Assume that the aggregation level is L, a starting subframe is $k_0$ and that a repetition time window extends maximally K subframes until subframe $k_{end}$. To avoid collisions among control channel candidates for enhanced coverage UEs, all aggregated CCEs/ECCEs in the repeating subband/time window can share the same searching space, i.e, $S_a^{(L,K)}=S_a^{(L,K)}$ and $ES_a^{(L,K)}=ES_a^{(L,K)}$ for a=1, ..., A, where A is the total aggregation level in both frequency (given by conventional aggregation level L) and time domain (given by the time domain repetition factor K). So, the UE monitors the same candidate m in every aggregated CCE/ECCE resource blocks in the weighted aggregation subband/time window.

Figure 5:
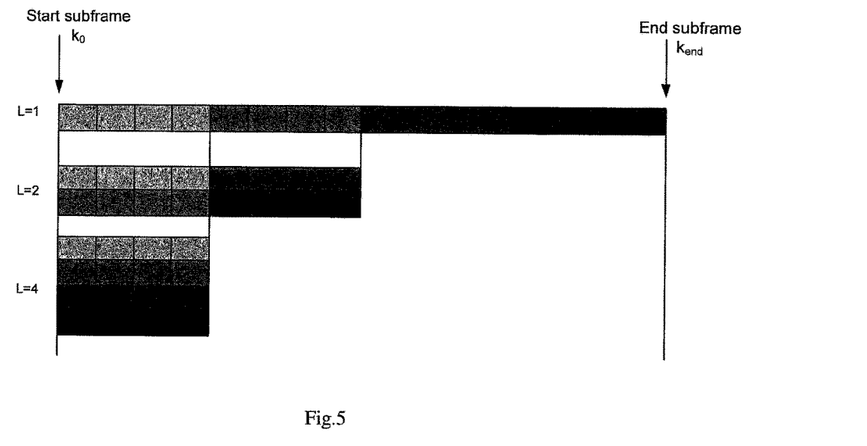
FIG. 5 shows a schematic diagram of weighted aggregation for the same aggregation level but different time/frequency domain repetitions.

To reach a coverage enhancement target, a certain UE requires a total CCE or ECCE aggregation level A if the aggregation level in each subframe's candidate m is summed across K subframes, as illustrated in FIG. 5. For an aggregation level L in every subframe, the relation A=L·K holds. In FIG. 5, weighted aggregation for the same aggregation level but different time/frequency domain repetitions, and different colors indicate different weights. eNB can determine two of the three parameters and determine the other according to performance target.

Consider the characteristics of 3D-MIMO antenna array that each antenna port may consist of multiple vertical antenna elements. In order to enhance the coverage of 3D-MIMO common control channel to achieve a performance target, e.g., for at least matching that of the 2D-MIMO system and avoid vertical dimension coverage hole, a base station 1 for transmitting control signals based on weighted aggregation of the present application will be illustrated with reference to FIG. 3:

Specifically, the vector determining apparatus 11 determines respective aggregation level weight vectors corresponding to the control signals to be transmitted by multiple antenna elements corresponding to a common control channel port.

Here, said respective aggregation level weight vectors mean each aggregation level has a corresponding aggregation level weighting vector; aggregation weight vectors of different aggregation levels can be uniformly expressed by equation (1):

$$w_a = (w_{a,1}, w_{a,2}, \ldots, w_{a,N}) \quad (1)$$

Where N is the number of antenna elements per PDCCH or ePDCCH port, a is an aggregation level, $w_a$ is the aggregation level weighting vector corresponding to the aggregation level a.

Here, the aggregation level weighting vector may be a DFT (Discrete Fourier Transformation) vector or a downtilt angle vector of the 3D-MIMO scenario.

For every weight component in the aggregation level weighting vector, the vector determining apparatus 11 may determine which through the equation (2) below:

$$w_{a,n} = e^{j \cdot (n-1) \frac{d}{\lambda} \cdot 2\pi \sin\left(\frac{\theta_a}{180^\circ} \pi\right)}, n = 1, \ldots, N \quad (2)$$

wherein, $w_{a,n}$ is the weight component for the n-th antenna element and the a-th aggregation level in the multiple antenna elements, d is the antenna element separation, N is the number of antenna elements in the multiple antenna elements, n is the n-th antenna element in the multiple antenna elements, λ is the wavelength adopted for transmitting said control signals, and $\theta_a$ is the downtilt angle corresponding to the a-th aggregation level.

Further, the vector determining apparatus 11 can obtain the aggregation level weighting vector $w_a$ corresponding to the aggregation level a. For example, suppose in a 3D-MIMO system, the antenna array corresponding to the PDCCH port includes 4 antenna elements (i.e., N=4), and the base station 1 in the system adopts aggregation level 1 and aggregation level 2. Then, according to equation (2), in the case of the aggregation level L=1, four weight components ($w_{1,1}$, $w_{1,2}$, $w_{1,3}$, $w_{1,4}$) can be obtained. Correspondingly, the corresponding aggregation level weighting vector is $w_1 = (w_{1,1}, w_{1,2}, w_{1,3}, w_{1,4})$; similarly, for aggregation level L=2, the vector determining apparatus 11 may also obtain corresponding 4 weight components $w_{2,1}$, $w_{2,2}$, $w_{2,3}$, $w_{2,4}$ according to equation (2); correspondingly, corresponding aggregation level weighting vector is $w_2 = (w_{2,1}, w_{2,2}, w_{2,3}, w_{2,4})$.

Those skilled in the art should understand that the above manner of determining every weight component in each of said aggregation level weight vectors is only an example, or those that can possibly come out later should also be contained in the protection scope of the application and included here in a way of quotation, if they are adaptable to this application.

Here, it can select the aggregation level weighting vector such that the joint blind detection performance of the weighted aggregations of the channel control information in search spaces $S_a^{(L,K)}$ or $ES_a^{(L,K)}$ can be optimized.

For the weighted aggregations of CCEs/ECCEs in search spaces $S_a^{(L,K)}$ or $ES_a^{(L,K)}$, determining the weight vectors set $W = \{w_1, \ldots, w_A\}$, such that $$W = \arg\max_w \left\{ \sum_{a=1}^{A} |w_a \Box s_a^{(L,K)}| \right\} \quad (3)$$

For a port consisting of N vertical antenna elements, the weight for the n-th antenna element and the a-th aggregation can be derived from a given downtilt angle allocated for this aggregation, as expressed in equation (1) above.

In equation (3), the combined power of all the weighted signal should be higher than the power of any individual weighted signal, i.e., $\left| \sum_{a=1}^{A} w_a \Box s_a^{(L,K)} \right| \geq |w_a \Box s_a^{(L,K)}|.$ In another word, for enhancing the joint detection performance of the control channel, we can determine the individual vector in W such that a UE can always receive at least one version of the control signals with boosted power. On the other hand, if any of the weighted aggregated signals has a boosted power, the weighted aggregation scheme will outperform the conventional aggregation/repetition scheme.

Figure 6:
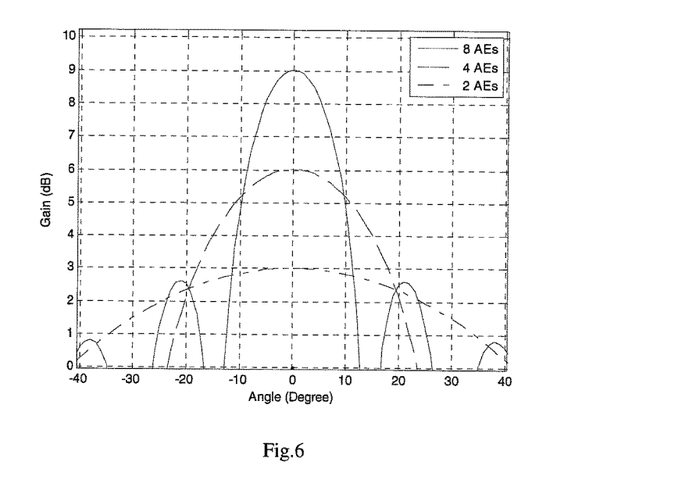
FIG. 6 shows a schematic diagram of antenna array gain pattern of different number elements with half wavelength separation.

Considering the UE dropping model in 3GPP 3D-MIMO channel model (UMa and UMi scenario) in TR36.873, the EOD is within the range of (70~120) degrees for UMi and (90~120) degrees for UMa. Hence, the EOD span is 50 degrees for UMi scenario, and 30 degrees for UMa scenario. FIG. 6 shows a beam gain pattern of an array having 2, 4, 8 antenna elements with half-wavelength separation, respectively. It is seen from FIG. 6 that in order to reach a 3 dB coverage gain, at the 3 dB gain in FIG. 6, the beam gain for the antenna array having 2 antenna elements is below 0 dB, the angle range corresponding to 3 dB beam gain for the antenna array having 4 antenna elements is (−18 degrees~+18 degrees), while the angle range corresponding to 3 dB beam gain for the antenna array having 8 antenna elements is (−11 degrees~+11 degrees). Therefore, for the 3 dB gain in FIG. 6, the maximum angular coverage range is 0, 36, 22 degrees for an array with 2, 4, 8 antenna elements (AEs), respectively.

Next, the transmitting apparatus 12 transmits the control signals through the multiple antenna elements based on said respective aggregation level weight vectors. For example, applying the respective aggregation level weight vectors to the control signals respectively, i.e., multiplying the respective aggregation level weight vectors with the vector corresponding to the control signals, respectively, so as to send the control signals out through the multiple antenna elements.

For the aggregated CCEs/ECCEs in search spaces $S_a^{(L,K)}$ or $ES_a^{(L,K)}$, applying the weight vector $w_a = (w_{a,1}, w_{a,2}, \ldots, w_{a,N})$ in equation (1) to the signal $s_a^{(L,K)} = s_a^{(L,K)} \cdot 1_{1 \times N}$ of each aggregated control signals, where $s_a^{(L,K)} = s_a^{(L,K)} \cdot 1_{1 \times N}$ denotes the control signals in the CCEs or ECCEs given by the search spaces sent out from multiple antennas of a PDCCH or ePDCCH transmission port, such that the control signals are sent out through multiple antennas of the PDCCH or ePDCCH port.

Respective apparatuses of the base station 1 work constantly between each other. Specifically, the vector determining apparatus 11 constantly determines respective aggregation level weight vectors corresponding to the control signals to be transmitted by multiple antenna elements corresponding to a common control channel port; the transmitting apparatus 12 constantly transmits the control signals through the multiple antenna elements based on said respective aggregation level weight vectors. Here, those skilled in the art should understand that "constantly" refers to respectively apparatuses of the base station 1 constantly determines respective aggregation level weight vectors, and transmits the control signals between each other, till the base station halts transmission of the downlink control signaling within a relatively long time.

Preferably, the base station 1 further comprises a downtilt angle determining apparatus (not shown). Specifically, the downtilt angle determining apparatus determines a downtilt angle corresponding to each aggregation level based on target angular coverage range and aggregation level application information. Here, the aggregation level application information refers to the number of aggregation levels adopted by the system, e.g., adopting 4 aggregation levels or adopting 2 aggregation levels, etc. Here, the target angle coverage range refers to the angles that are required to be covered, e.g., the vertical angles that are required to be covered.

For example, suppose in a 3D-MIMO system, there exist 4 aggregation levels, e.g., L1, L2, L3 and L4; the vertical angles that are required to be covered are 80~120 degrees, totally within a span of 40 degrees; then the downtilt angle determining apparatus may averagely allocate the 40 degrees to each aggregation level, i.e., each aggregation level may cover 10-degree span, thereby obtaining that the downtilt angles corresponding to the aggregation levels L1, L2, L3 and L4 are 85, 95, 105, 115, respectively; or the downtilt angle determining apparatus may also determine the downtilt angle corresponding to each aggregation level in a predetermined manner, e.g., suppose it is predetermined that the aggregation levels L1 and L2 need to cover a 5 degree span, while L3 and L4 need to cover a 15 degree span; then the downtilt angle determining apparatus may obtain that the downtilt angles corresponding to the aggregation levels L1, L2, L3 and L4 are 82.5, 87.5, 97.5, and 112.5, respectively.

Those skilled in the art should understand that the above manner of determining a downtilt angle corresponding to each aggregation level is only an example, or those that can possibly come out later should also be contained in the protection scope of the application and included here in a way of quotation, if they are adaptable to this application.

More preferably, the base station 1 also comprises a basic determining apparatus (not shown). Specifically, the basic determining apparatus determines a corresponding basic aggregation level based on the number of the antenna elements in the multiple antenna elements and said required angular coverage range. Here, the basic aggregation level refers to the minimum number of aggregations of the required angular coverage range.

For the weighted aggregations of CCEs/ECCEs in search spaces $S_a^{(L,K)}$ or $ES_a^{(L,K)}$, in order to achieve a control channel coverage gain target, the minimum number of aggregations of the required angular coverage range, i.e., the basic aggregation level ($A_{min}$) can be determined with regard to the number of antenna elements (N) per PDCCH or EPDCCH port, the antenna array pattern.

For example, according to the antenna array pattern and the 3GPP 3D-MIMO UE dropping model, the basic determining apparatus may derive:

1) for the UMi scenario, if the number of antenna elements N=4, the corresponding maximum angle coverage range is 36 degrees, and the EOD span of the UMi scenario is 50 degrees, then $$A_{min} = \left\lceil \frac{50}{36} \right\rceil = 2;$$

similarly, if N=8, $A_{min}$=3;

2) for UMa scenario, $A_{min}$ if N=4, $A_{min}$=2 if N=8

Larger K value than $A_{min}$ can be used in practice and will bring larger coverage gain at the cost of more CCE/ECCE resource occupation. The number of antenna elements per PDCCH or ePDCCH port (N) is a predefined system parameter.

In a preferred embodiment (see FIG. 3), the base station 1 further comprises a sending apparatus (not shown); the user equipment 2 comprises a first receiving apparatus (not shown) and a second receiving apparatus (not shown). Specifically, the transmitting apparatus 12 of the base station 1 sends the control signals to a corresponding user equipment through the multiple antenna elements based on said respective aggregation level weight vectors; correspondingly, the first receiving apparatus of the user equipment 2 receives control signals transmitted by a corresponding base station through multiple antenna elements corresponding to a common control channel, wherein the control signals are transmitted based on respective aggregation level weight vectors corresponding to the multiple antenna elements; the sending apparatus of the base station 1 sends the respective aggregation level weight vectors to a corresponding user equipment for DCI blind detection; correspondingly, the second receiving apparatus of the user equipment 2 receives said respective aggregation level weight vectors sent by the base station for performing DCI blind detection operation to obtain downlink control information corresponding to the control signals.

Here, the user equipment 2 refers to a portion in the mobile communication device which terminates wireless transmission from or to a network and adapts the capability of the terminal device to the wireless transmission, i.e., a device for the user to access to the mobile network. The user equipment 2 includes, but not limited to, any electronic product that may perform human-machine interaction with a user through a keyboard, a touch panel, or an acoustic control device and may transmit mobile communication signals through mutual transmission and reception of signals between the mobile network and the base station, e.g., a tablet computer, a smart phone, a PDA, a vehicle computer, etc. Here, the mobile network includes, but not limited to, GSM, 3G, LTE, Wi-Fi, WiMax, WCDMA, CDMA2000, TD-SCDMA, HSPA, LTD, etc. Those skilled in the art should understand that the above user equipment is only an example, or those that can possibly come out later should also be contained in the protection scope of the application and included here in a way of quotation, if they are adaptable to this application.

Specifically, the transmitting apparatus 12 of the base station 1 sends the control signals to a corresponding user equipment through the multiple antenna elements based on said respective aggregation level weight vectors.

For example, for the aggregated CCEs/ECCEs in search spaces $S_a^{(L,K)}$ or $ES_a^{(L,K)}$, the transmitting apparatus 12 applies the weight vector $w_a = (w_{a,1}, w_{a,2}, \ldots, w_{a,N})$ in equation (1) to the signal $s_a^{(L,K)} = s_a^{(L,K)} \cdot 1_{1 \times N}$ of each aggregated control signals, where $s_a^{(L,K)} = s_a^{(L,K)} \cdot 1_{1 \times N}$ denotes the control signals in the CCEs or ECCEs given by the search spaces sent out from multiple antennas of a PDCCH or ePDCCH transmission port, such that the control signals are sent out through multiple antennas of the PDCCH or ePDCCH port.

Correspondingly, the first receiving apparatus of the user equipment 2 receives control signals transmitted by a corresponding base station through multiple antenna elements corresponding to a common control channel, wherein the control signals are transmitted based on respective aggregation level weight vectors corresponding to the multiple antenna elements.

The sending apparatus of the base station 1 sends the respective aggregation level weight vectors to a corresponding user equipment for DCI blind detection. For example, suppose in a 3D-MIMO system, the antenna array corresponding to the PDCCH port includes 4 antenna elements (i.e., N=4), the two aggregation levels employed by the base station 1 in the system is 1 and 2, respectively; then according to equation (2), for the aggregation level L=1, 4 weight components $w_{1,1}$, $w_{1,2}$, $w_{1,3}$ $w_{1,4}$ can be obtained; correspondingly, the corresponding aggregation level weight vector $w_1=(w_{1,1}, w_{1,2}, w_{1,3}, w_{1,4})$; similarly, for the aggregation level L=2, the vector determining apparatus 11 may also obtain corresponding 4 weight components $w_{2,1}$, $w_{2,2}$, $w_{2,3}$, $w_{2,4}$ according to equation (2); correspondingly, the corresponding aggregation level weight vector $w_2=(w_{2,1}, w_{2,2}, w_{2,3}, w_{2,4})$; then the sending apparatus sends both $w_1=(w_{1,1}, w_{1,2}, w_{1,3}, w_{1,4})$ and $w_2=(w_{2,1}, w_{2,2}, w_{2,3}, w_{2,4})$ to the user equipment 2.

Correspondingly, the second receiving apparatus of the user equipment 2 receives said respective aggregation level weight vectors sent by the base station for performing DCI blind detection operation to obtain downlink control information corresponding to the control signals. For example, continued with the example above, the second receiving apparatus of the user equipment 2 receives the aggregation level weight vectors $w_1=(w_{1,1}, w_{1,2}, w_{1,3}, w_{1,4})$ and $w_2=(w_{2,1}, w_{2,2}, w_{2,3}, w_{2,4})$ sent by the base station 1; then the second receiving apparatus can determine respective aggregation levels based on the aggregation weight vectors, so as to first perform space search in the CCEs/ECCEs corresponding to the aggregation level, i.e., first performing space search at the aggregation level 1 corresponding to $w_1$ and aggregation level 2 corresponding to $w_2$, thereby facilitating the blind detection process.

Here, those skilled in the art should understand, in specific embodiments, the transmitting apparatus 12 and the sending apparatus of the base station 1 may perform serially or parallel; the transmitting apparatus 12 and the sending apparatus may be integrated together or may be mutually independent apparatuses.

Here, those skilled in the art should understand, in specific embodiments, the first receiving apparatus and the second receiving apparatus of the user equipment 2 may perform serially or parallel; the first receiving apparatus and the second receiving apparatus may be integrated together or may be mutually independent apparatuses.

Figure 7:
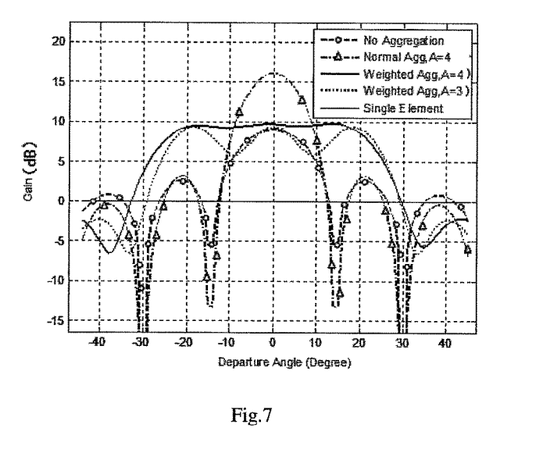
FIG. 7 shows a schematic diagram of gain pattern derived from simulating an antenna array with 8 vertical antenna elements per PDCCH port (i.e., N=8) according to the solution of the present application.

FIG. 7 shows a schematic diagram of gain pattern derived from simulating an antenna array with 8 vertical antenna elements per PDCCH port (i.e., N=8) according to the solution of the present application. It is seen from FIG. 7 that in the case that 50 degrees of EOD span is required (for 3D UMi scenario) and no coverage hole is permitted (all UEs are within 3 dB beamwidth), then the weighted aggregation scheme with a minimum aggregation factor of A=3 (i.e., scenario 4 in FIG. 7 (weighted aggregation A=3)) of the present application can be adopted. Preferably, the weighted aggregation scheme with a minimum aggregation factor of A=4 (i.e., scenario 3 in FIG. 7 (weighted aggregation A=4)) of the present application can be adopted. In either case, on one hand, compared with the normal simple aggregation A=4 (i.e., scenario 2 in FIG. 7 (traditional single aggregation), the antenna array gain of the present application is more evenly distributed in the entire EOD span. And on the other hand, the gains relative to both non-aggregation (i.e., scenario 1 in FIG. 7 (non-aggregation)) and single antenna element (i.e., scenario 5 in FIG. 7 (single antenna element)) cases are still significant.

Figure 8:
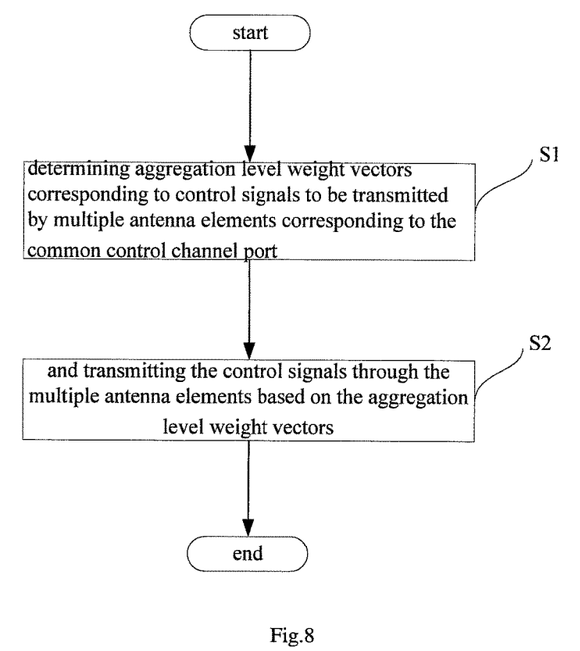
FIG. 8 shows a flow diagram of a method for transmitting control signals based on weighted aggregation according to another aspect of the present application.

FIG. 8 shows a flow diagram of a method for transmitting control signals based on weighted aggregation according to another aspect of the present application.

Wherein, the method comprises the step S1 and the step S2. Specifically, in the step S1, the base station 1 determines respective aggregation level weight vectors corresponding to the control signals to be transmitted by multiple antenna elements corresponding to a common control channel port; in the step S2, the base station 1 transmits the control signals through the multiple antenna elements based on said respective aggregation level weight vectors. Here, the base station 1 refers to a device that connects a fixed part and a wireless part in a mobile communication system and is connected to a mobile station via an air wireless transmission, including, but not limited to, Node B base station, eNB base station, etc. Those skilled in the art should understand that base station are only examples, and other existing or future possibly emerging base stations, if applicable to the present application, should also be included within the protection scope of the present application, and are incorporated here by reference.

Here, in order to better understand the present application, first, analysis on the requirement for 3D-MIMO system coverage enhancement will be illustrated:

In order to identify the coverage enhancement for the PDCCH channel under 3D-MIMO, two system level simulations are carried on both UMa scenario (Urban Macro cell with high (outdoor/indoor) UE density, hereinafter referred to as "3D UMa") and UMi scenario (Urban Micro cell with high (outdoor/indoor) UE density, hereinafter referred to as "3D UMi") based on the 3GPP 3D-MIMO channel model in TR 36.973 standard, respectively. One is for configuration 1 with single antenna element per port (i.e., traditional 2D-MIMO having a linear array), the other is for configuration 2 with 10 elements per port (i.e., 3D-MIMO having a planar array). By measuring the SINRs (Signal to Interference plus Noise Ratios) of all UEs at a given port (e.g., port 0), CDFs (cumulative distribution functions) of different scenarios and different configurations shown in FIG. 4 are derived, thereby showing differences of corresponding SINRs. From the FIG. 4 it can be seen that the per-port SINR of configuration 1 (conventional 2D-IMO with linear array) is almost always 3 dB higher than that of configuration 2 (3D-MIMO with planar array). This observation illustrates that the common control channel of a 3D-MIMO system is 3 dB worse than that of a comparable 2D-MIMO system. The reason is that in 2D-MIMO system, each antenna port consists of multiple antenna elements, but in 3D-MIMO system, each port may only consist of one element thus have less combining gain.

In the current LTE specifications, the search spaces $S_k^{(L)}$ and $ES_k^{(L)}$ for PDCCH and EPDCCH (enhanced PDCCH) respectively defines a set of control channel candidates for each aggregation level L and subframe K. Which CCE (Control Channel Element) or ECCE (Enhanced Control Channel Element) that belong to each candidate are given by the search space equations in 3GPP TS 36.213. In addition to L and K, the RNTI (Radio Network Temporary Identifier) and the EPDCCH set index and size has impact on the search space expression.

To enhance the coverage of the control channels in 3D-MIMO, a simple method is to repeat the transmission of the CCEs/ECCEs given by the same search spaces within a subband/time window, e.g., several consecutive RBs/subframes. Assume that the aggregation level is L, a starting subframe is $k_0$ and that a repetition time window extends maximally K subframes until subframe $k_{end}$. To avoid collisions among control channel candidates for enhanced coverage UEs, all aggregated CCEs/ECCEs in the repeating subband/time window can share the same searching $S_a^{(L,K)} = S_a^{(L,K)}$ and $ES_a^{(L,K)} = ES_a^{(L,K)}$ space, i.e, $S_a^{(L,K)} = S_a^{(L,K)}$ and $ES_a^{(L,K)} = ES_a^{(L,K)}$ for a=1, . . . , A, where A is the total aggregation level in both frequency (given by conventional aggregation level L) and time domain (given by the time domain repetition factor K). So, the UE monitors the same candidate m in every aggregated CCE/ECCE resource blocks in the weighted aggregation subband/time window.

To reach a coverage enhancement target, a certain UE requires a total CCE or ECCE aggregation level A if the aggregation level in each subframe's candidate m is summed across K subframes, as illustrated in FIG. 5. For an aggregation level L in every subframe, the relation A=L·K holds. In FIG. 5, weighted aggregation for the same aggregation level but different time/frequency domain repetitions, and different colors indicate different weights. eNB can determine two of the three parameters and determine the other according to performance target.

Consider the characteristics of 3D-MIMO antenna array that each antenna port may consist of multiple vertical antenna elements. In order to enhance the coverage of 3D-MIMO common control channel to achieve a performance target, e.g., for at least matching that of the 2D-MIMO system and avoid vertical dimension coverage hole, a base station 1 for transmitting control signals based on weighted aggregation of the present application will be illustrated with reference to FIG. 8:

Specifically, in the step S1, the base station 1 determines respective aggregation level weight vectors corresponding to the control signals to be transmitted by multiple antenna elements corresponding to a common control channel port.

Here, said respective aggregation level weight vectors mean each aggregation level has a corresponding aggregation level weighting vector; aggregation weight vectors of different aggregation levels can be uniformly expressed by equation (4):

$$w_a = (w_{a,1}, w_{a,2}, \ldots, w_{a,N}) \quad (4)$$

Where N is the number of antenna elements per PDCCH or ePDCCH port, a is an aggregation level, $w_a$ is the aggregation level weighting vector corresponding to the aggregation level a.

Here, the aggregation level weighting vector may be a DFT (Discrete Fourier Transformation) vector or a downtilt angle vector of the 3D-MIMO scenario.

For every weight component in the aggregation level weighting vector, in the step S1, the base station 1 may determine which through the equation (5) below:

$$w_{a,n} = e^{j \cdot (n-1) \frac{d}{\lambda} \cdot 2\pi \sin\left(\frac{\theta_a}{180°} \pi\right)}, n = 1, \ldots, N \quad (5)$$

wherein, $w_{a,n}$ is the weight component for the n-th antenna element and the a-th aggregation level in the multiple antenna elements, d is the antenna element separation, N is the number of antenna elements in the multiple antenna elements, n is the n-th antenna element in the multiple antenna elements, λ is the wavelength adopted for transmitting said control signals, and $\theta_a$ is the downtilt angle corresponding to the a-th aggregation level.

Further, in the step S1, the base station 1 can obtain the aggregation level weighting vector $w_a$ corresponding to the aggregation level a. For example, suppose in a 3D-MIMO system, the antenna array corresponding to the PDCCH port includes 4 antenna elements (i.e., N=4), and the base station 1 in the system adopts aggregation level 1 and aggregation level 2. Then, according to equation (5), in the case of the aggregation level L=1, four weight components ($w_{1,1}$, $w_{1,2}$, $w_{1,3}$, $w_{1,4}$) can be obtained. Correspondingly, the corresponding aggregation level weighting vector is $w_1 = (w_{1,1}, w_{1,2}, w_{1,3}, w_{1,4})$; similarly, for aggregation level L=$_2$, in the step S1, the base station 1 may also obtain corresponding 4 weight components $w_{2,1}, w_{2,2}, w_{2,3}, w_{2,4}$ according to equation (5); correspondingly, corresponding aggregation level weighting vector is $w_2 = (w_{2,1}, w_{2,2}, w_{2,3}, w_{2,4})$.

Those skilled in the art should understand that the above manner of determining every weight component in each of said aggregation level weight vectors is only an example, or those that can possibly come out later should also be contained in the protection scope of the application and included here in a way of quotation, if they are adaptable to this application.

Here, it can select the aggregation level weighting vector such that the joint blind detection performance of the weighted aggregations of the channel control information in search spaces $S_a^{(L,K)}$ or $ES_a(L,K)$ can be optimized.

For the weighted aggregations of CCEs/ECCEs in search spaces $S_a^{(L,K)}$ or $ES_a^{(L,K)}$, determining the weight vectors set $W = \{w_1, \ldots, w_A\}$, such that $$W = \arg\max_w \left\{ \sum_{a=1}^{A} |w_a \square s_a^{(L,K)}| \right\} \quad (6)$$

For a port consisting of N vertical antenna elements, the weight for the n-th antenna element and the a-th aggregation can be derived from a given downtilt angle allocated for this aggregation, as expressed in equation (4) above.

In equation (6), the combined power of all the weighted signal should be higher than the power of any individual weighted signal, $$i.e., \left| \sum_{a=1}^{A} w_a \square s_a^{(L,K)} \right| \geq |w_a \square s_a^{(L,K)}|.$$

In another word, for enhancing the joint detection performance of the control channel, we can determine the individual vector in W such that a UE can always receive at least one version of the control signals with boosted power. On the other hand, if any of the weighted aggregated signals has a boosted power, the weighted aggregation scheme will outperform the conventional aggregation/repetition scheme.

Considering the UE dropping model in 3GPP 3D-MIMO channel model (UMa and UMi scenario) in TR36.873, the EOD is within the range of (70~120) degrees for UMi and (90~120) degrees for UMa. Hence, the EOD span is 50 degrees for UMi scenario, and 30 degrees for UMa scenario. FIG. 6 shows a beam gain pattern of an array having 2, 4, 8 antenna elements with half-wavelength separation, respectively. It is seen from FIG. 6 that in order to reach a 3 dB coverage gain, at the 3 dB gain in FIG. 6, the beam gain for the antenna array having 2 antenna elements is below 0 dB, the angle range corresponding to 3 dB beam gain for the antenna array having 4 antenna elements is (−18 degrees~+18 degrees), while the angle range corresponding to 3 dB beam gain for the antenna array having 8 antenna elements is (−11 degrees~+11 degrees). Therefore, for the 3 dB gain in FIG. 6, the maximum angular coverage range is 0, 36, 22 degrees for an array with 2, 4, 8 antenna elements (AEs), respectively.

Next, in the step S2, the base station 1 transmits the control signals through the multiple antenna elements based on said respective aggregation level weight vectors. For example, applying the respective aggregation level weight vectors to the control signals respectively, i.e., multiplying the respective aggregation level weight vectors with the vector corresponding to the control signals, respectively, so as to send the control signals out through the multiple antenna elements.

For the aggregated CCEs/ECCEs in search spaces $S_a^{(L,K)}$ or $ES_a^{(L,K)}$, applying the weight vector $w_a = (w_{a,1}, w_{a,2}, w_{a,3}, w_{a,4})$ in equation (4) to the signal $s_a^{(L,K)} = s_a^{(L,K)} \cdot 1_{1 \times N}$ of each aggregated control signals, where $s_a^{(L,K)} = s_a^{(L,K)} \cdot 1_{1 \times N}$ denotes the control signals in the CCEs or ECCEs given by the search spaces sent out from multiple antennas of a PDCCH or ePDCCH transmission port, such that the control signals are sent out through multiple antennas of the PDCCH or ePDCCH port.

Respective steps of the base station 1 work constantly between each other. Specifically, in the step S1, the base station 1 constantly determines respective aggregation level weight vectors corresponding to the control signals to be transmitted by multiple antenna elements corresponding to a common control channel port; in the step S2, the base station 1 constantly transmits the control signals through the multiple antenna elements based on said respective aggregation level weight vectors. Here, those skilled in the art should understand that "constantly" refers to respectively steps of the base station 1 constantly determines respective aggregation level weight vectors, and transmits the control signals between each other, till the base station halts transmission of the downlink control signaling within a relatively long time.

Preferably, the method further comprises the step S3 (not shown). Specifically, in the step S3, the base station 1 determines a downtilt angle corresponding to each aggregation level based on target angular coverage range and aggregation level application information. Here, the aggregation level application information refers to the number of aggregation levels adopted by the system, e.g., adopting 4 aggregation levels or adopting 2 aggregation levels, etc. Here, the target angle coverage range refers to the angles that are required to be covered, e.g., the vertical angles that are required to be covered.

For example, suppose in a 3D-MIMO system, there exist 4 aggregation levels, e.g., L1, L2, L3 and L4; the vertical angles that are required to be covered are 80~420 degrees, totally within a span of 40 degrees; then in the step S3, the base station 1 may averagely allocate the 40 degrees to each aggregation level, i.e., each aggregation level may cover 10-degree span, thereby obtaining that the downtilt angles corresponding to the aggregation levels L1, L2, L3 and L4 are 85, 95, 105, 115, respectively; or in the step S3, the base station 1 may also determine the downtilt angle corresponding to each aggregation level in a predetermined manner, e.g., suppose it is predetermined that the aggregation levels L1 and L2 need to cover a 5 degree span, while L3 and L4 need to cover a 15 degree span; then in the step S3, the base station 1 may obtain that the downtilt angles corresponding to the aggregation levels L1, L2, L3 and L4 are 82.5, 87.5, 97.5, and 112.5, respectively.

Those skilled in the art should understand that the above manner of determining a downtilt angle corresponding to each aggregation level is only an example, or those that can possibly come out later should also be contained in the protection scope of the application and included here in a way of quotation, if they are adaptable to this application.

More preferably, the method also comprises the step S4 (not shown). Specifically, in the step S4, the base station 1 determines a corresponding basic aggregation level based on the number of the antenna elements in the multiple antenna elements and said required angular coverage range. Here, the basic aggregation level refers to the minimum number of aggregations of the required angular coverage range.

For the weighted aggregations of CCEs/ECCEs in search spaces $S_a^{(L,K)}$ or $ES_a^{(L,K)}$, in order to achieve a control channel coverage gain target, the minimum number of aggregations of the required angular coverage range, i.e., the basic aggregation level ($A_{min}$) can be determined with regard to the number of antenna elements (N) per PDCCH or EPDCCH port, the antenna array pattern.

For example, according to the antenna array pattern and the 3GPP 3D-MIMO UE dropping model, in the step S4, the base station 1 may derive:

1) for the UMi scenario, if the number of antenna elements N=4, the corresponding maximum angle coverage range is 36 degrees, and the EOD span of the UMi scenario P is 50 degrees, $$A_{min} = \left\lceil \frac{50}{36} \right\rceil = 2;$$

then similarly, if N=8, $A_{min}$=3;

2) for UMa scenario, $A_{min}$=1 if N=4, $A_{min}$=2 if N=8

Larger K value than a can be used in practice and will bring larger coverage gain at the cost of more CCE/ECCE resource occupation. The number of antenna elements per PDCCH or ePDCCH port (N) is a predefined system parameter.

In a preferred embodiment (see FIG. 8), the method further comprises the step S5 (not shown). Specifically, in the step S2, the base station 1 sends the control signals to a corresponding user equipment through the multiple antenna elements based on said respective aggregation level weight vectors; correspondingly, the user equipment 2 receives control signals transmitted by a corresponding base station through multiple antenna elements corresponding to a common control channel, wherein the control signals are transmitted based on respective aggregation level weight vectors corresponding to the multiple antenna elements; in the step S5, the base station 1 sends the respective aggregation level weight vectors to a corresponding user equipment for DCI blind detection; correspondingly, the user equipment 2 receives said respective aggregation level weight vectors sent by the base station for performing DCI blind detection operation to obtain downlink control information corresponding to the control signals.

Here, the user equipment 2 refers to a portion in the mobile communication device which terminates wireless transmission from or to a network and adapts the capability of the terminal device to the wireless transmission, i.e., a device for the user to access to the mobile network. The user equipment 2 includes, but not limited to, any electronic product that may perform human-machine interaction with a user through a keyboard, a touch panel, or an acoustic control device and may transmit mobile communication signals through mutual transmission and reception of signals between the mobile network and the base station, e.g., a tablet computer, a smart phone, a PDA, a vehicle computer, etc. Here, the mobile network includes, but not limited to, GSM, 3G, LTE, Wi-Fi, WiMax, WCDMA, CDMA2000, TD-SCDMA, HSPA, LTD, etc. Those skilled in the art should understand that the above user equipment is only an example, or those that can possibly come out later should also be contained in the protection scope of the application and included here in a way of quotation, if they are adaptable to this application.

Specifically, in the step S2, the base station 1 sends the control signals to a corresponding user equipment through the multiple antenna elements based on said respective aggregation level weight vectors.

For example, for the aggregated CCEs/ECCEs in search spaces $S_a^{(L,K)}$ or $ES_a^{(L,K)}$, in the step S2, the base station 1 applies the weight vector $w_a = (w_{a,1}, w_{a,2}, \ldots, w_{a,N})$ in equation (4) to the signal $s_a^{(L,K)} = s_a^{(L,K)} \cdot 1_{1 \times N}$ of each aggregated control signals, where $s_a^{(L,K)} = s_a^{(L,K)} \cdot 1_{1 \times N}$ denotes the control signals in the CCEs or ECCEs given by the search spaces sent out from multiple antennas of a PDCCH or ePDCCH transmission port, such that the control signals are sent out through multiple antennas of the PDCCH or ePDCCH port.

Correspondingly, the user equipment 2 receives control signals transmitted by a corresponding base station through multiple antenna elements corresponding to a common control channel, wherein the control signals are transmitted based on respective aggregation level weight vectors corresponding to the multiple antenna elements.

In the step S5, the base station 1 sends the respective aggregation level weight vectors to a corresponding user equipment for DCI blind detection. For example, suppose in a 3D-MIMO system, the antenna array corresponding to the PDCCH port includes 4 antenna elements (i.e., N=4), the two aggregation levels employed by the base station 1 in the system is 1 and 2, respectively; then according to equation (5), for the aggregation level L=1, 4 weight components $w_{1,1}, w_{1,2}, w_{1,3}, w_{1,4}$ can be obtained; correspondingly, the corresponding aggregation level weight vector $w_1 = (w_{1,1}, w_{1,2}, w_{1,3}, w_{1,4})$; similarly, for the aggregation level L=2, in the step S1, the base station 1 may also obtain corresponding 4 weight components $(w_{2,1}, w_{2,2}, w_{2,3}, w_{2,4})$ according to equation (5); correspondingly, the corresponding aggregation level weight vector $w_2 = (w_{2,1}, w_{2,2}, w_{2,3}, w_{2,4})$; then in the step S5, the base station 1 sends both $w_1 = (w_{1,1}, w_{1,2}, w_{1,3}, w_{1,4})$ and $w_2 = (w_{2,1}, w_{2,2}, w_{2,3}, w_{1,4})$ to the user equipment 2.

Correspondingly, the user equipment 2 receives said respective aggregation level weight vectors sent by the base station for performing DCI blind detection operation to obtain downlink control information corresponding to the control signals. For example, continued with the example above, the user equipment 2 receives the aggregation level weight vectors $w_1 = (w_{1,1}, w_{1,2}, w_{1,3}, w_{1,4})$ and $w_2 = (w_{2,1}, w_{2,2}, w_{2,3}, w_{2,4})$ sent by the base station 1; then the user equipment 2 can determine respective aggregation levels based on the aggregation weight vectors, so as to first perform space search in the CCEs/ECCEs corresponding to the aggregation level, i.e., first performing space search at the aggregation level 1 corresponding to $w_1$ and aggregation level 2 corresponding to $w_2$, thereby facilitating the blind detection process.

Here, those skilled in the art should understand, in specific embodiments, the step S2 and in the step S5 may perform serially or parallel.

It should be noted that the present application may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, part of the present application may be applied as a computer program product, e.g., a computer program instruction, which, when being executed by a computer, may invoke or provide a method and/or technical solution according to the present application through operation of the computer. The program instruction that invokes a method of the present application may be stored in a fixed or mobile recording medium, and/or transmitted through broadcast and/or a data flow in other signal carrier medium, and/or stored in a work memory running according to the program instruction in a computer device. Here, an embodiment according to the present application includes an apparatus that includes a memory for storing computer program instructions and a processor for executing program instructions, wherein when being executed by the processor, the computer program instruction triggers the apparatus to carry out the methods and/or technical solutions according to various embodiments of the present application.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

I claim:

1. A method for transmitting control signals from a base station based on weighted aggregation, comprising:
   determining respective aggregation level weight vectors corresponding to the control signals to be transmitted by a base station in a three-dimensional (3-D) multiple-input multiple-output (MIMO) system via multiple antenna elements corresponding to a physical downlink control channel (PDCCH) port; and
   transmitting the control signals from the base station via the multiple antenna elements corresponding to the PDCCH port based on said respective aggregation level weight vectors.

2. The method according to claim 1, wherein the determining comprises:

determining weight components in each of said aggregation level weight vectors in the manner below so as to obtain corresponding said aggregation level weight vectors:

$$w_{a,n} = e^{j \cdot (n-1)\frac{d}{\lambda} \cdot 2\pi \sin\left(\frac{\theta_a}{180°}\pi\right)}, n = 1, \ldots, N$$

wherein, $w_{a,n}$ is a weight component for an n-th antenna element and an a-th aggregation level in the multiple antenna elements, d is an antenna element separation, N is a number of antenna elements in the multiple antenna elements, n is an n-th antenna element in the multiple antenna elements, λ is a wavelength adopted for transmitting said control signals, and $\theta_a$ is a downtilt angle corresponding to the a-th aggregation level.

3. The method according to claim 1, further comprising:
determining a corresponding basic aggregation level for transmission of the control signals based on a number of antenna elements in the multiple antenna elements and target angular coverage range.

4. The method according to claim 1, wherein, the method further comprising:
sending the respective aggregation level weight vectors to a corresponding user equipment for blind detection of downlink control information.

5. The method according to claim 1, wherein the transmitting comprises:
sending the control signals to a corresponding user equipment via the multiple antenna elements corresponding to the PDCCH port based on said respective aggregation level weight vectors.

6. The method according to claim 1, wherein the aggregation level weight vectors are determined for a corresponding number of aggregation levels associated with the multiple antenna elements and the PDCCH port such that each aggregation level has a corresponding aggregation level weight vector.

7. The method according to claim 6, wherein the aggregation level weight vectors of a corresponding aggregation level are expressed as follows:

$$w_a = (w_{a,1}, w_{a,2}, \ldots, w_{a,N})$$

wherein, N is a number of antenna elements per PDCCH port, a is an aggregation level, and $w_a$ is the aggregation level weighting vector corresponding to aggregation level a.

8. The method according to claim 6, wherein the method further comprises:
determining a downtilt angle corresponding to each aggregation level associated with the multiple antenna elements based on target angular coverage range and aggregation level application information.

9. The method according to claim 1, wherein the aggregation level weight vectors include discrete Fourier transformation (DFT) vectors.

10. A base station for transmitting control signals based on weighted aggregation, comprises:
at least one processor configured to, determine respective aggregation level weight vectors corresponding to the control signals to be transmitted via multiple antenna elements corresponding to a physical downlink control channel (PDCCH) port in a three-dimensional (3-D) multiple-input multiple-output (MIMO) system; and
a transmitter configured to, transmit the control signals via the multiple antenna elements corresponding to the PDCCH port based on said respective aggregation level weight vectors.

11. The base station according to claim 10, wherein the at least one processor is configured to:
determine weight components in each of said aggregation level weight vectors in the manner below so as to obtain corresponding said aggregation level weight vectors:

$$w_{a,n} = e^{j \cdot (n-1)\frac{d}{\lambda} \cdot 2\pi \sin\left(\frac{\theta_a}{180°}\pi\right)}, n = 1, \ldots, N$$

wherein, $w_{a,n}$ is a weight component for an n-th antenna element and an a-th aggregation level in the multiple antenna elements, d is an antenna element separation, N is a number of antenna elements in the multiple antenna elements, n is an n-th antenna element in the multiple antenna elements, λ is a wavelength adopted for transmitting said control signals, and $\theta_a$ is a downtilt angle corresponding to the a-th aggregation level.

12. The base station according to claim 10, wherein the at least one processor is configured to determine a corresponding basic aggregation level for transmission of the control signals based on a number of antenna elements in the multiple antenna elements and target angular coverage range.

13. The base station according to claim 10, wherein the transmitter is configured to send the respective aggregation level weight vectors to a corresponding user equipment for blind detection of downlink control information.

14. The base station according to claim 10, wherein the transmitter is configured to
send the control signals to a corresponding user equipment via the multiple antenna elements corresponding to the PDCCH port based on said respective aggregation level weight vectors.

15. The base station according to claim 10, wherein the at least one processor is configured to determine the aggregation level weight vectors for a corresponding number of aggregation levels associated with the multiple antenna elements and the PDCCH port such that each aggregation level has a corresponding aggregation level weight vector.

16. The base station according to claim 15, wherein the aggregation level weight vectors of a corresponding aggregation level are expressed as follows:

$$w_a = (w_{a,1}, w_{a,2}, \ldots, w_{a,N})$$

wherein, N is a number of antenna elements per PDCCH port, a is an aggregation level, and $w_a$ is the aggregation level weighting vector corresponding to aggregation level a.

17. The base station according to claim 15, wherein the at least one processor is configured to determine a downtilt angle corresponding to each aggregation level associated with the multiple antenna elements based on target angular coverage range and aggregation level application information.

18. The base station according to claim 10, wherein the aggregation level weight vectors include discrete Fourier transformation (DFT) vectors.

* * * * *